United States Patent [19]
Brodmann

[11] 3,985,935
[45] Oct. 12, 1976

[54] ALKALI RESISTANT PERLITE - CAO VITREOUS FIBERS

[75] Inventor: Franz Josef Brodmann, Philadelphia, Pa.

[73] Assignee: General Refractories Company, Bala Cynwyd, Pa.

[22] Filed: Oct. 16, 1973

[21] Appl. No.: 406,833

[52] U.S. Cl. .................................. 428/401; 65/5; 106/DIG. 2; 106/50; 106/52; 252/378 P; 264/DIG. 19
[51] Int. Cl.² .................. C07B 37/06; C07C 13/00
[58] Field of Search ........... 106/50, DIG. 1, DIG. 2; 252/378 P; 264/DIG. 19, DIG. 26; 428/401

[56] References Cited
UNITED STATES PATENTS

| | | | |
|---|---|---|---|
| 2,462,255 | 2/1949 | Charman et al. | 106/DIG. 2 |
| 2,467,889 | 4/1949 | Harter et al. | 106/50 |
| 2,576,312 | 11/1951 | Minnick et al. | 106/50 |
| 3,007,806 | 11/1961 | Hartwig | 106/50 |
| 3,679,443 | 7/1972 | Mechel et al. | 106/50 |

OTHER PUBLICATIONS

"Low–alkali Glass Fiber Produced from Pumice and Perlites," Rustambekyan et al., CA 79: 20089v (1972).
"Production of New Compositions of Glass Mosaic Floor Tile," Kutateladge et al., Glass & Ceramics (USA), vol. 28, No. 1–2, 1971.
"Some Economic Aspects of Perlite" C. R. King, Mining Transactions, vol. 184, pp. 310–312, Aug. 1949.

*Primary Examiner*—Allen B. Curtis
*Assistant Examiner*—Thomas A. Waltz
*Attorney, Agent, or Firm*—Everett H. Murray, Jr.

[57] ABSTRACT

Alkali resistant glass fibers and mineral wool are produced from perlite by heating perlite ores until the melt viscosity is under 15 poise and impinging a stream of the melt with a gas at from 80 to 100 psig to produce the fibers.

2 Claims, No Drawings

ALKALI RESISTANT PERLITE - CaO VITREOUS FIBERS

The present invention is directed to alkali resistant glass fibers. More particularly, the invention is directed to glass fibers having improved alkali resistance that are made from perlite and a process for the production thereof.

Commercial glass fibers often contain from about 50 to 60% glass network former and from 40 to 50% of what is called a network modifier. These glasses, however, are relatively soluble in acidic and alkaline environments due to the high amount of fluxing materials such as alkali metal oxides. The alkali solubility of such glasses can impair their utility in areas such as filtering when a highly alkaline medium is to be filtered. For example, glass fiber packing could well have impaired utility if used in filtering solutions such as those of alkali metal hydroxides. Further, in the building industry, conventional glass fibers normally disintegrate if they are used as concrete and gypsum plaster fillers.

The prior art has suggested many different materials for producing glass fibers. For example, in U.S. Pat. No. 2,190,271, the general term "rock" is utilized to describe the material used to prepare fibrous products. Further, quartz and other silicacontaining naturally occurring materials have been suggested for use in making such fibers. However, particularly in the case of quartz, extremely high temperatures are required which increases production costs. Further, raw material availability, as well as expense, are pertinent factors since they also result in more expensive products.

Also, significant studies have been undertaken to determine the chemical durability of various industrial glasses and to find which components in the various industrial glasses result (by their presence) in increased resistance to acid or alkali attack or other characteristics. An exemplary study is "The Chemical Durability of Complex Industrial Glasses", by B. M. Cameron and M. H. Horne in *Glass Technology*, Vol. 5, No. 3, June 3, 1964. However, as noted in this article, the complexity of the compositions tested made it impossible to draw fundamental conclusions as to the efficacy of various components. The only conclusion that Cameron and Horne were able to draw with regard to alkali solubility was that the boric oxide ($B_2O_3$) content should generally be kept low.

Therefore, an object of the present invention is to provide relatively inexpensive glass fibers or mineral wool.

Another object of the present invention is to provide an economical process for producing such fibers.

A further object of the present invention is to provide such fibers with high alkali resistance as compared to conventional glass fibers.

These and other objects will be obvious from the remainder of the present specification.

In the present invention, it has been found that glass fibers of high alkali resistance may be made from commercially available natural perlite. It has further been found that concentrations of up to about 25% calcium oxide, preferably from about 5 to 15% calcium oxide, further decrease the alkali solubility of glass fibers made from perlite. In particular, it has been found that the glass fibers resulting from melted perlite have almost linear alkali solubility with time, as opposed to normal industrial glass fibers which increase in alkali solubility when exposed to alkaline environments for significant periods of time. Thus, the present invention is directed to alkali resistant glass fibers resulting from fluxed or unfluxed perlite fibers.

In the process of the present invention, perlite ore (preferably in the crushed form) is calcined and then melted in, e.g. an electric arc furnace until the melt viscosity is under 15 poise. A stream of the melt provided, for example, by pouring the melt into an inclined trough with the lower end open, is then impinged with pressurized gas, e.g. air, which is at a low temperature, e.g. room temperature. The gas stream fiberizes the glass and, unlike normal glass fiber processes which usually use steam, quenches the melt. By this quick quench process, the alkaline material resistant glass of the present process is produced.

Perlite is a naturally occurring glass-like material of varying composition. Generally, however, it contains from 72–74% silica, 12–13% alumina, and 13–14% fluxes by weight. The fluxes are usually materials such as soda, potash and lime. In addition, the perlite rock may contain from about 3–6% by weight water. However, this composition is only generic and may vary outside of the above limits depending upon e.g. the geographical source and the depth at which the perlite is obtained. Perlite in either the expanded or unexpanded form may be utilized to form the fibers of the present invention. However, the unexpanded form is preferred, particularly in view of the fact that it is less expensive.

The fibers of the present invention may be utilized, for example, in filter materials such as beds or mats in gypsum and cement bodies or in any of the other normal uses of glass fibers or mineral wool where an alkali sensitive material would be less advantageous.

The fibrous material of the present invention may be produced by conventional fiberizing processes, e.g. as drawn staple or by blowing a melt. However, it is preferred to fiberize the perlite ore from about 1600°–2000° C., preferably about 1750°–1850° C., depending upon the ore by blowing a stream of compressed air tangentially against a stream of the molten material. This heating can be done in an electric arc furnace or a high temperature gas fired furnace in normal manner. However, in order to fiberize the perlite ore, melt viscosities less than about 15 poise, preferably less than about 10 poise and most preferably from about 5 to 10 poise, should be utilized. Also, it is preferable that the ores with relatively higher Loss On Ignition (LOI) values be used. Additionally, the fibers of the present invention are usually of from about 1.0 to 10 microns in diameter, preferably about 2 to 5 microns and vary in length from about 0.5" to 3.0", preferably about 0.5" to 1.0". The cooling of the fiber after drawing or blowing is quite important, it being preferable that the fiber be cooled from about 1850° C. to room temperature in a short period of time, preferably less than one minute. This quick cooling apparently prevents phase separations and thus improves the characteristics of the product.

On the process of the present invention, blowing of the above melt may be accomplished at a pressure of from 80 to 120 psig, preferably from 95 to 105 psig. The gas used for blowing is usually air due to its availability, but may be other non-reactive gases such as nitrogen and carbon dioxide. The important feature, as above, is that the gas usually be at room temperature or near room temperature, i.e. from about 10° to 50° C., preferably about 10° to 25° C. This temperature assures that almost simultaneous fiberizing and quenching of the melt occurs and thus that the process of the present invention results in the alkali resistant fibers of the invention. The flux, when used, is added during the melting step or can be included with the mix prior to melting.

The following examples will serve to further illustrate the present invention.

EXAMPLE I

Two different raw perlite ores were calcined and heated separately in a 17 Kva carbon arc furnace until the viscosity of the melt was about 5 to 10 poise. A pencil-thin stream of the melt was then poured from the furnace and a blast of compressed air blown tangentially across the stream. The resulting perlite fibers were collected. The ore compositions being used are those shown in Table I.

Table I

|  | Perlite Ore No. 1 | | Perlite Ore No. 2 | |
|---|---|---|---|---|
|  | Raw | Calcined | Raw | Calcined |
| $SiO_2$ | 73.52% | 75.42% | 71.62% | 75.95% |
| $Al_2O_3$ | 13.02 | 13.36 | 12.60 | 13.36 |
| $TiO_2$ | 0.01 | 0.01 | 0.01 | 0.01 |
| $Fe_2O_3$ | 0.62 | 0.64 | 0.70 | 0.74 |
| CaO | 0.43 | 0.44 | 0.91 | 0.97 |
| MgO | 0.03 | 0.03 | 0.05 | 0.05 |
| $Na_2O$ | 5.20 | 5.33 | 3.84 | 4.07 |
| $K_2O$ | 4.64 | 4.76 | 4.56 | 4.84 |
| L.O.I.* | 3.00 | — | 5.09 | — |

*Loss on Ignition - % weight loss after calcining at about 1,000°C. for approximately 1.0 hours.

EXAMPLE II

Aproximately 1500 grams of milled perlite ore No. 1, as above, was placed in a lined and coated furnace and heated to 1800° C. ± 50°. After the sample was retained at this environment for about 4½ hours, it appeared to have reached a viscosity of less than 10 poise. A stream of perlite glass melt was then run out of the furnace and a blast of 100 ± psig air was directed against the stream of melted glass at right angles. The sheer force of the air formed small droplets of molten ore and these droplets were propelled through the air forming fibers of various thicknesses and lengths.

EXAMPLE III

Utilizing the same material as in Example II, a heating time of 5.5 hours was used, but the viscosity of the ore was too high to produce fibers in the range of less than 2 microns diameter.

EXAMPLE IV

The second perlite ore was utilized in the same furnace as that used for Examples II and III. The heating temperature was again 1800± 50° C., but the ore was only retained at this temperature for a period of 3 hours in this Example. However, the melt appeared to be homogenous and had a lower viscosity than that utilized in the prior examples. In this case, a blowing pressure of 95±5 psig was utilized and finer fibers were produced, having a diameter of about 1 micron.

EXAMPLE V

In this case, the second perlite ore was again used and the same relative heating times and periods were used. However, 10% calcium oxide flux was added to the ore prior to the formation of the melt. In this case, one inch long and about 1 micron thin fibers were produced and also an extensive amount of wool type fibers were obtained. The fiber diameter of the wool type material was found to range from about 2 to 5 microns, and thus it is seen that wool fibrous type material may be produced as well as the conventional fiber glass type materials produced in the prior examples. Table 2 indicates the composition of the resulting fibrous material.

Table II

| Component | $SiO_2$ | $Al_2O_3$ | $TiO_2$ | $Fe_2O_3$ | CaO | MgO | Alkalies |
|---|---|---|---|---|---|---|---|
| Wt. Pct. | 68.02 | 11.97 | 0.01 | 0.66 | 11.30 | 0.05 | 7.98 |

EXAMPLE VI

Utilizing the same material as in Example V, but substituting 25% calcium oxide flux for the 10% calcium oxide flux used in Example V, further fibers were produced. The results of this Example were substantially the same as those of Example V.

EXAMPLE VII

In order to test the alkali solubility of the fibers of the present invention, a one molar concentrated solution of sodium hydroxide was utilized in accord with ASTM Test D-1283-57, used to test wool fiber solubility. The results of these tests utilizing perlite ore No. 2 above in both the fluxed and unfluxed fibrous condition along with comparative data for normal glass fibers of the composition below which were of the same size as the perlite fibers, are shown in Table 3.

Table III

| Component | $SiO_2$ | $Al_2O_3$ | $Fe_2O_3$ | CaO | MgO | $Na_2O$ | $K_2O$ |
|---|---|---|---|---|---|---|---|
| Wt. Pct. | 52.90 | 13.97 | 0.21 | 21.48 | 0.69 | 0.93 | 0.14 |

The results given are percents by weight lost determined by the weight loss of the samples, based on the original weight when the samples are oven dried prior to weighing. Treatment for the specified times was effected in an aqueous 1.0 normal sodium hydroxide solution.

Table IV

| Time | Perlite Fibers | | | Glass Fibers |
|---|---|---|---|---|
|  | No CaO | 10% CaO | 25% CaO |  |
| 25 hrs | 1.25 | .55 | .75 | 5.25 |
| 50 hrs | 1.60 | .75 | .95 | 5.55 |
| 75 hrs | 1.80 | .15 | .30 | 7.00 |
| 100 hrs | 2.70 | .45 | .75 | 8.50 |

From the above tables, it can be seen that even without calcium oxide added, great reductions in alkali solubility result from perlite fibers when they are compared with standard glass fibers. Further, when up to about 10% calcium oxide is added to the perlite ore and thus included in the fibers, even greater reductions in alkali solubility are obtained.

What is claimed:

1. An alkali resistant mineral wool fibrous materil consisting essentially of vitreous fibers having 5 to 15% CaO as the sole additive to naturally occurring perlite ore and resulting in said vitreous fibers containing from about 72 to about 74% $SiO_2$, from about 12 to about 13% $Al_2O_3$ and from about 5 to 15% of CaO, the said percentages being weight percentages based on the weight of said perlite, said fibers being characterized by a low weight percent loss in up to 100 hours in aqueous 1.0 normal sodium hydroxide solution amounting to not more than 0.75% loss at a 10% content of CaO and being further characterized in having a diameter of 2 to 5 microns and a length of about 0.5 to 3 inches.

2. The fibrous material of claim 1 wherein said calcium oxide is present in an amount of about 10% by weight of the fibers.

* * * * *